United States Patent [19]

Herring et al.

[11] 4,024,501
[45] May 17, 1977

[54] LINE DRIVER SYSTEM

[75] Inventors: William M. Herring, Campton Township, Kane County; James P. Johnson, Warrenville; Dennis B. Walling, Darien, all of Ill.

[73] Assignee: Standard Oil Company, Chicago, Ill.

[22] Filed: Sept. 3, 1975

[21] Appl. No.: 609,942

[52] U.S. Cl. .......................... 340/147 R; 178/58 A
[51] Int. Cl.² ......................................... H04Q 1/00
[58] Field of Search ................. 178/68, 58 R, 58 A, 178/70; 179/20 P; 250/199, 551; 340/147 R

[56] References Cited

UNITED STATES PATENTS

| | | | |
|---|---|---|---|
| 3,843,834 | 10/1974 | Burke | 178/58 A |
| 3,872,439 | 3/1975 | Salam | 340/147 R |
| 3,875,332 | 4/1975 | Fletcher | 178/58 A |
| 3,943,284 | 3/1976 | Nelson | 178/58 R |

Primary Examiner—Harold I. Pitts
Attorney, Agent, or Firm—Claron N. White; Arthur G. Gilkes; William T. McClain

[57] ABSTRACT

A line driver system for digital communication, using logic-level voltages, between an electronic transmitter-receiver device and an electronic receiver device, such as between a computer and a typewriter, a line printer or a cathode ray tube, has the transmitter-receiver device at a location remote from the receiver device. An output of the transmitter-receiver device is electronically coupled to an input of the receiver device using one line of a communications bus. This output of the transmitter-receiver device is coupled to that line of the bus through an optical isolator and then through a power booster. The receiver device has an output that provides a voltage signal when the receiver device is switched on-line. This voltage signal is provided at that output of the receiver device when the receiver device is capable of transforming digital information, that is provided at its input, to a readable form that is printed or displayed by the receiver device. This output of the receiver device is coupled through another optical isolator and through another power booster to a second line of the bus so that this second line of the bus receives a voltage signal when the receiver device is in the on-line condition. This second line of the bus is electronically coupled to an input of the transmitter-receiver device that senses the presence of this signal at that input prior to initiating a transmittal of digital information as logic-level voltages to the first line of the bus to provide logic-level voltages at the input of the receiver device. Each power booster has a high current gain amplifier with unity voltage gain. When the receiver device is also a transmitter device another output of the receiver device is electronically coupled through an optical isolator and a further power booster to a third line of the bus that is electronically coupled to another input of the transmitter-receiver device so that digital information as logic-level voltages are received from the receiver device by the transmitter-receiver device.

15 Claims, 1 Drawing Figure

LINE DRIVER SYSTEM

BACKGROUND OF THE INVENTION

1. Field of the Invention

The system of the invention is in the field of digital communication systems.

2. Description of the Prior Art

There are many systems in the art that effect transmission of digital signals from one electronic device to another electronic device. A general limitation of such systems is their inability to transmit over long distances at high signal rates without loss of signal fidelity.

Where transmission is effected between a computer and remote recorders such as typewriters or line printers, it is desirable to include a construction such that the computer senses whether or not the recorder is in service at the time that the information is to be transmitted to it. Otherwise, there can be a complete loss of data output from the computer. Although transmission systems do exist where recorders furnish signals to indicate that they are in service and capable of receiving signals transmitted to them, such systems are generally of the audio-frequency modulation type or of the current-loop type. The audio-frequency modulation type requires special coder-decoder devices at the computer and recorder and usually is limited to relatively slow signal transmission rates. The current-loop type is limited to the relatively short distances permitted by acceptable transmission line resistance.

SUMMARY OF THE INVENTION

This invention relates to a line driver system for digital communication, using logic-level voltages, between an electronic transmitter-receiver device (hereinafter usually referred to as a transmitter device) and an electronic receiver device, such as between a computer and a typewriter, a line printer or a cathode ray tube, in which the transmitter device is at a location remote from the receiver device and in which an output of the transmitter device is electronically coupled to an input of the receiver device using one line of a communications bus.

The line driver system of the invention is a construction that provides from the receiver device a voltage signal to the transmitter device when the receiver device is in the on-line condition, that is, in a condition to receive digital signals from the transmitter device and to transform these signals to a readable form that is printed or displayed by the receiver device. The transmitter device is contructed or programmed to sense the presence or absence of this transmitted voltage signal from the receiver device before transmitting the digital information to the receiver device so that when the transmitter device is ready to transmit this digital information and the voltage signal from the receiver device is not sensed, the transmitter device will communicate with a standby electronic device to which it will transmit the digital information for a printout of the information in readable form or for storage. The standby electronic device can be located at the area containing the transmitter device.

The system of the invention is especially useful when the two electronic devices are separated from each other by a long distance, i.e., a distance of hundreds of feet up to thousands of feet. This is a common situation when the transmitter device, such as a computer, is located at an area remote from the receiver device that is usually located in an area adjacent to process apparatus that provides analog information that is locally converted to digital information in the form of binary information, that is transmitted to the computer through a communications bus in parallel or by serialization. In that case the computer is programmed to utilize the binary information in computations that provide information in digital form that will be transmitted to the receiver device at that location of the process apparatus for printing or visual display in a form that can be read by a person at that location of the process apparatus. A number of process apparatus may be located at different areas and each will contain one or more receiver devices. As a result it is not feasible to locate the transmitter device, such as a computer, at a location that is near all of these process apparatus. Rather the transmitter device is somewhat centrally located and the distance from it to each of the receiver devices is a long distance that may be 4,000 feet or more.

In the transmission of the digital information as voltage levels from the transmitter device to the receiver device merely by a long line connecting them there can be a loss of fidelity of the information due to voltage drops. The voltage levels at the receiver device are lower and can be at the same or lower levels than induced line noise. Failure of the transmitter device to recognize that the receiver device cannot act on the transmitted signal to type, i.e., print, or display a message can cause a loss of valuable information.

The system of the present invention insures that the transmitter device recognizes that the receiver device cannot act on the transmitted signals to type or display a message based on the transmitted digital information and based on this recognition the transmitter device can function to transmit the digital information to a standby device for storage or for a printed recording instead of losing the output data that would otherwise be lost if the digital information were transmitted at that time to the receiver device.

In addition to the system insuring that the transmitter device recognizes that the receiver device is not in a condition to act on the transmitted signals because the latter device is not in the on-line condition, the system includes means to insure the fidelity of the signal from the receiver device that is recognized by the transmitter device when the receiver device is in the condition to accept signals from the transmitter device and to act on these signals if they have adequate fidelity to provide by the receiver device a transformation to a readable form. For this purpose the system includes, for the transmission of the signal to be recognized by the transmitter device for the indication that the receiver device is in the on-line condition, a power booster that has a high current gain amplifier with unity voltage gain so that this voltage signal from the receiver device is driven to the transmitter device with sufficient power that the transmitter device senses that the receiver device is in the on-line condition.

The system of the invention further includes a power booster at the location of the transmitter device to provide a similar driving power for the logic-level voltages from the transmitter device that constitute the digital information being transmitted from the transmitter device to the receiver device even though this transmission is the long distance mentioned above.

When the receiver device is a typewriter it may be one that is capable of operating also as an electronic transmitter device. In that case the system of the invention includes another power booster that drives signals as data output from the typewriter to the bus and ultimately to the transmitter device.

The presence of the power booster or power boosters in the construction of the system of the present invention described above provides the fidelity required for satisfactory transmission of signals from the transmitter device to the receiver device and, when the receiver device is also a transmitter device, to provide digital information from the receiver device to the transmitter device.

In the preferred embodiment of the system of the invention the input of the power booster that is connected to an output of the receiver device to provide the recognition voltage signal to the transmitter device, when the receiver device is in the on-line condition, is not coupled directly to that output of the receiver device but rather is coupled through an optical isolator. The line of the bus that is provided with this recognition voltage signal is coupled to the input of the transmitter device through an optical isolator. The output of the transmitter device is coupled to the input of the associated power booster through an optical isolator and the line of the bus that is connected to the output of that power booster is coupled to the input of the receiver device through an optical isolator. Also, if the receiver device is one that can provide digital information as voltage signals to the transmitter device and has a power booster coupling the output, for this purpose, of the receiver device to the bus, the input of that power booster is coupled to the receiver device by still another optical isolator. In this case the line of the bus, that is connected to the output of that power booster and thus contains digital information as voltage signals for the transmitter device, is coupled to the transmitter device through a further optical isolator. This construction prevents the transfer of spurious voltage signals from the receiver device through the bus to the transmitter device.

An optical isolator is a solid state device having a light-emitting diode and a transistor that is conducting when it receives a photon emitted by the diode. The diode is coupled to the transmitter device or the receiver device or a line of the communication bus, as the case may be in accordance with the foregoing description, that provides the voltage to make the transistor conducting. The transistor of the optical isolator is coupled to the input of one of the power boosters at the receiver device, to the input of the power booster at the transmitter device, or to an input of the receiver device or to an input of the transmitter device, as the case may be.

The power booster, that is used in the present system, is a high current gain amplifier with unity voltage gain as mentioned above. It is a monolithic solid state device.

Because power boosters and optical isolators are used in the various aspects of the system of the invention, it is possible to send voltage-level signals rather than the "make and break" signals produced by physical relays. The use of voltage levels allows the use of industry standard (EIA RS-232) component interfaces at both the transmitter device and the receiver device. The use of relays would require a fabrication of suitable interfaces for both the transmitter device and the receiver device. Furthermore, the use of these solid state components, i.e., power boosters and optical isolators, in the system of the present invention makes it possible to transmit digital signals at a 9600 bit per second rate that is required in a substantial use of the system for transmission of signals from a transmitter device, specifically a computer, to a receiver device, such as a typewriter, line printer, or cathode ray tube. This requirement of a high bit rate is due to the fact that the computer must scan a large number of other systems in the area of the receiver device and perform various arithmetic operations to provide information to the receiver device and in some cases to provide information to other locations. As a result, a limited time is available for the computer to scan the on-line condition of the receiver device, to transmit digital information to the latter and, when it is a typewriter, to receive digital information from the receiver device. The use of wire contact or reed relays in lieu of optical isolators in the system would not permit the use of a 9600 bit per second rate for transmission of digital signals.

An aspect of the invention is a printed circuit board or card on which are mounted the optical isolators and the power boosters that are used to couple the typewriter, as the receiver device, at the typewriter location to the lines of the bus that are coupled at the other location to the transmitter device. The components mounted on the printed circuit board include these optical isolators and power boosters that are connected to suitable conducting lines to connect these components and to conducting lines of the board that are connected to a board edge connector to which lines from the bus and from the typewriter, or line printer, or cathode ray tube are connected. Preferably the printed circuit board has mounted on it a conventional power supply that provides specific voltages required for the operation of the power boosters etc. on the board. When there is in the system an optical isolator that couples the line of the bus that contains logic-level signals from the transmitter device for the receiver device, that optical isolator is connected to conducting lines of the board that are connected to the edge connector for the connection of that optical isolator to the bus and to the receiver device. When the receiver device is a typewriter, that can provide digital information to the transmitter device, the printed circuit board further includes another optical isolator and another power booster, as described earlier for the coupling of the typewriter to a line of the bus that is coupled to the computer, to provide a recognition voltage signal. In that case the printed circuit board also contains suitable conducting lines between this optical isolator and this power booster and from them to the edge connector for coupling to the typewriter and to the bus. The conducting lines on the printed circuit board, to which the edge connector is coupled, are connected to pins or sockets that are mounted on the board and each of these is connected to a complementary pin or socket of the edge connector. The design of the printed circuit card is such that it can serve either as a transmitter board or a receiver board; conducting lines exist on the card for both functions, and only the necessary components — optical isolators, power boosters, etc. — are assembled on the card that are required to make it serviceable as a transmitter or receiver board. This design provides the advantage of one common printed circuit card, serving as a transmitter or receiver board, that can be mass-produced by a printed circuit card manufacturer at a lower cost than separate cards, thus minimizing the cost of the line driver system.

DETAILED DESCRIPTION

Figure 1:
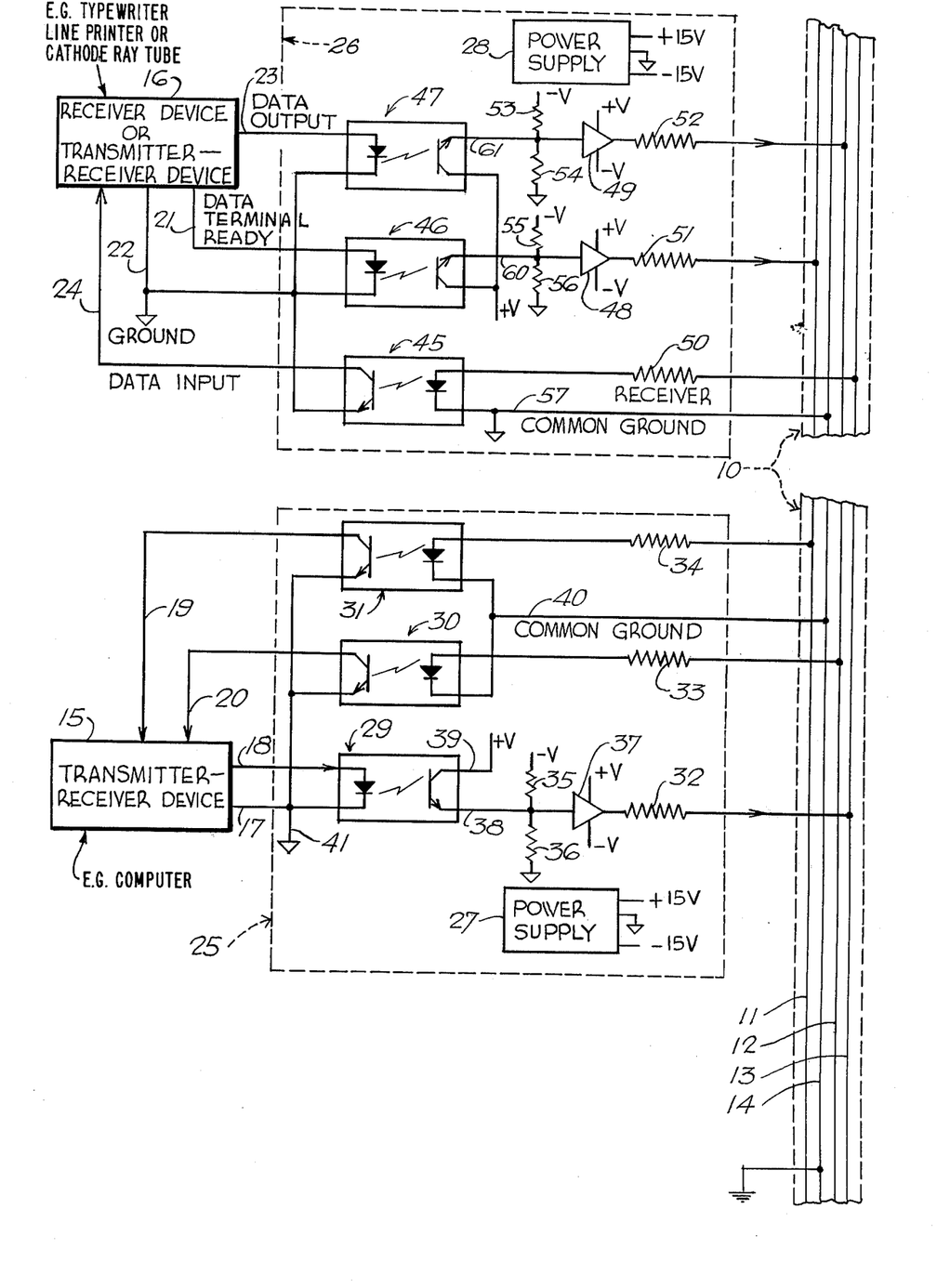
The drawing is a block diagram that represents schematically the line driver system of the present invention and illustrates the use of a computer, as the transmitter device, and of a typewriter, as the receiver device, that is capable of transmitting logic-level signals to the computer.

As seen in the drawing, a bus generally indicated at 10 contains four lines 11, 12, 13 and 14. The lines 11 through 13 provide communication between a transmitter-receiver device 15 (that is illustratively a computer and hereinafter referred to as computer 15) and a receiver or transmitter-receiver device 16 (that is illustratively a typewriter and hereinafter referred to as typewriter 16) in the manner described later. Each of the lines 11 through 13 is actually a twisted pair of wires. One wire of each pair carries signals and the second wire of each pair is tied to the second wire of the other pairs and grounded to prevent cross talk between the signal-containing wires. The line 14 is connected by a line (not numbered) to ground and thus is a common line at ground potential of bus 10. The grounded second wires of the three pairs of wires mentioned above can serve as the common ground. In one use of the system, the pairs of wires, i.e., lines 11 through 13, constitute at least a part of one channel of communications bus 10. Other lines of that channel are used with other systems of the present invention at the location of the typewriter and process apparatus or at other locations at which are located other typewriters and process apparatus. Other channels of the bus contain lines as twisted pairs of wires and these channels are coupled to systems such as disclosed and claimed in copending U.S. Pat. applications Ser. Nos. 500,321 and 514,495 filed Aug. 26, 1974, and Oct. 15, 1974, respectively, by two of the present applicants and assigned to the assignee of the present application. These applications are now U.S. Pat. Nos. 3,967,095 and 3,968,487, respectively. Illustratively, computer 15 is a Modcomp II minicomputer while typewriter 16 is illustratively a Texas Instruments Series 700 typer. The computer 15 has a ground terminal, a number of output terminals, and a number of input terminals. The ground terminal is connected to a line 17. One of the input terminals is connected to a line 18 to provide logic-level voltage signals corresponding to digital information to be transmitted by computer 15 to typewriter 16. One of the input terminals of computer 15 is connected to a line 19 to receive a voltage signal from typewriter 16 when typewriter 16 is in the on-line condition. The computer is programmed so that in its operation it interrogates this input terminal to determine whether there is or is not a voltage signal on line 19 and thus whether typewriter 16 is in the on-line condition. This interrogation by computer 15 is programmed by the computer to occur immediately before computer 15 operates to provide logic-level voltage signals to line 18. If the voltage signal is not on line 19, computer 15 will not provide the logic-level voltage signals to line 18 for transfer to typewriter 16 but instead, in accordance with its program in such event, computer 15 will transfer this digital information to a standby device (not shown) using another output terminal (not shown).

Another input terminal of computer 15 is connected to a line 20 to receive digital information in the form of logic-level voltage signals that are provided by logic-level voltage signals, as data output, from typewriter 16 as described later.

The typewriter 16 is connected to a power source (not shown) such as 120V AC. The typewriter has a terminal that provides a positive voltage signal. This signal is provided at this terminal if typewriter 16 is switched to the on-line condition and if typewriter 16 is properly connected to the power source. In this case typewriter 16 is in the on-line condition. Conventionally typewriter 16 is connected to the power source by a cord that is plugged into an outlet at the location of typewriter 16. In the event that the cord is deplugged inadvertently or the cord becomes inoperative due to a short circuit or there is no power at the outlet, typewriter 16 is not operative, even though it is switched on, so that it is not in the on-line condition. In that event, of course, the output terminal does not have the voltage mentioned above the typewriter 16 is not operative to transform digital information to a printed form. This output terminal of typewriter 16 is connected to a line 21. The typewriter 16 also has a terminal that is connected to ground by a line 22.

The typewriter 16 includes another output terminal that is provided with logic-level voltage signals representing digital information corresponding to information that is provided by an operation of typewriter 16. This output terminal is connected to a line 23. The typewriter 16 further has an input terminal that is connected to a line 24 to receive data input as logic-level voltage signals corresponding to digital information transmitted by computer 15. These voltage signals are transformed by typewriter 16 to provide a print-out in alphanumerical form of the information received from computer 15 via line 24.

In the event that typewriter 16 is merely an electronic receiver device it will not have an output terminal to which is connected line 23 as described above. Similarly, if device 16 is merely a line printer device or a cathode ray tube device that cannot operate to transmit as well as to receive digital information, line 23 is not used. In these cases the system of the invention is as described below except for those components etc., that are present in the system being described and shown in the drawing for providing the transmission of digital information from device 16, i.e., typewriter 16, to computer 15.

The system of the invention that is shown in the drawing as the preferred embodiment further includes a printed circuit board generally indicated at 25 and a printed circuit board generally indicated at 26. Both printed circuit boards 25 and 26 are fabricated from the common printed circuit card referred to earlier that contains a pattern of conducting lines for interconnecting components mounted on the board and provides for connecting lines to an edge connector. In this specific system of the invention illustrated in the drawing, only those components and interconnecting lines on the card necessary for implementing the functions of the specific boards in this system are shown and described. The board 25 is at the location of computer 15 while board 26 is at the location of typewriter 16. These locations, in the most useful aspect of the invention, are a long distance apart as described earlier. Each of printed circuit boards 25 and 26 contains a number of printed conducting lines that are on the board in a suitable pattern for interconnecting various components mounted on the board and for providing conducting lines to one or more margins of the board from these mounted components for the connection of these components to computer 15 or typewriter 16, as the case may be, or for connection to lines 11 through 14 of bus 10. The pattern of these printed conducting lines will be apparent from the following descriptions of these components as mounted on board 25 and board 26.

The board 25 has mounted on it a power supply 27 while board 26 has mounted on it a power supply 28. Each of power supplies 27 and 28 is connected to a power source, such as mentioned above, by means (not shown). Each is connected to a ground as shown in the drawing. Each has an output of +15V DC and −15V DC, as seen in the drawing, and these voltages are used in parts of the circuitry shown in the drawing including inputs to the power boosters mentioned below. An illustrative power supply is Analog Devices Model 904 power supply sold by Analog Devices, Inc., Norwood, Mass.

The printed circuit board 25 has mounted on it three optical isolators generally indicated at 29,30 and 31. Also mounted on board 25 are resistors 32,33,34,35 and 36 and a power booster 37. Each of the optical isolators 29 through 31 and those mentioned later is a solid state device having a light-emitting diode and a transistor that is conducting when it receives a photon emitted by the diode. An illustrative optical isolator is optically coupled isolator TIL 112. Each of power booster 37 and the power boosters mentioned later is a high current gain amplifier with unity voltage gain. An illustrative power booster is MC1438R power booster. It can deliver load currents up to ±300 ma. and thus is ideally suited for driving low impedance loads. The low output impedance (10 ohms typical) allows the MC1438R power booster to drive a capacitive load with greatly reduced phase shift compared with other operational amplifiers. The high input impedance (0.4 megaohms) gives the appearance to the signal source of a very small load.

The power booster 37 is provided, as shown, with +V and −V to two of its terminals from the output of power supply 27. The input of power booster 37 is connected to a line 38 that is connected to the emitter of the transistor of optical isolator 29. The collector of that transistor is connected by a line 39 that provides +V. The resistor 35 is connected to the −V of power supply 27 and the other end of resistor 35 is connected to line 38 at a common junction with resistor 36 that is connected to ground potential. The reason for this construction of connecting resistors 35 and 36 to line 38 is described later.

The lines 17 and 18 are connected to the cathode and anode, respectively, of the diode of the optical isolator 29. The line 17 is connected between computer 15 and isolator 29 to a line 41 that is connected to the common ground. When the line 18 provides from computer 15 a positive voltage signal to the anode of isolator 19, optical isolator 29 is set with its transistor conducting so that voltage is applied from the emitter of the transistor to line 38. As a result a positive voltage is applied to line 38. Because resistor 35 is connected to a negative voltage and is connected to line 38, and resistor 36, that is connected to ground, is connected to line 38, the input voltage of line 38 to booster 37 depends upon whether voltage is applied to line 18 from the output of computer 15. When this output of computer 15 does not apply the positive voltages to line 18, optical isolator 29 is not set and the end result is the input of line 38 to booster 37 is a different voltage. Thus the output of booster 37 is at two different levels of voltage. These levels are dependent upon whether there is a voltage output of computer 15 applied to line 18. This output of booster 37, that is dependent upon the logic-level voltage signals applied to line 18 by computer 15, is applied to line 13 of bus 10. The actual voltages applied to line 13 are dependent upon the resistance value of resistor 32.

The line 12 of bus 10 is provided with two levels of voltage in a serialization form representing binary information that is the output of typewriter 16 as data output to be transmitted to computer 15. These voltage signals are provided from line 12 to resistor 33 that is connected to line 12 and from resistor 33 to the anode of the diode of optical isolator 30. At one of the voltage levels isolator 30 is set with the transistor of isolator 30 being conductive so that a voltage signal is applied by line 20 to an input of computer 15. The data, i.e., digital information from typewriter 16, applied to line 23 from typewriter 16, are received as the logic-level voltage signals, in a serialization manner, at the input of computer 15 that is connected to line 20. The level is dependent upon whether isolator 30 is set or is not set.

A voltage signal is applied to line 11 of bus 10 when typewriter 16 is in the on-line condition. The optical isolator 31 has the anode of its diode connected through resistor 34 to line 11. When this voltage signal is on line 11, isolator 31 is set so that its transistor is conducting whereby a voltage signal is applied by line 19 from the collector of the transistor of isolator 31 to an input of computer 15. When this voltage signal is not on line 11 there is no voltage signal on line 19. The computer 15 is programmed to sense the presence or absence of voltage at the input connected to line 19. If that input has the voltage applied the computer will operate to provide digital information as logic-level voltage signals to line 18 for transmittal of data via line 13 of bus 10 to typewriter 16 for a printout of the information.

The line 41 that is connected to ground is connected by lines (not numbered) to the emitters of the transistors of optical isolators 30 and 31. The cathodes of the diodes of optical isolators 30 and 31 are connected by lines (not numbered) to line 40, so that these cathodes are connected to common ground line 14 of bus 10.

The printed circuit board 26 has a number of appropriate printed conducting lines on it that interconnnect various components that are mounted on board 26. These components include: power supply 28; three optical isolators generally indicated at 45,46 and 47; power boosters 48 and 49; and resistors 50,51,52,53,54,55 and 56.

The cathode of the diode of isolator 45 is connected by a line 57 to common ground line 14 of bus 10. The anode of this transistor is connected through resistor 50 to line 13 of bus 10 so that isolator 45 is set or not set dependent upon the voltage level on line 13. The collector of the transistor of isolator 45 is connected by line 24 to the input of typewriter 16. With this construction the logic-level voltage signals provided by line 18 from computer 15 to line 13 provide logic-level voltage signals by line 24 to the input of typewriter 16 to operate typewriter 16 for a printout of the information transmitted as digital information from computer 15.

The emitter of the transistor of isolator 45 and the cathodes of the diodes of isolators 46 and 47 are connected by lines (not numbered) to line 22 that is connected to a terminal of typewriter 16 and to ground. Line 21 that is connected to the terminal of typewriter 16 that provides a voltage signal when typewriter 16 is in the on-line condition, as described above, is connected to the anode of the diode of isolator 46. When this voltage is on line 21, the transistor of isolator 46 is conductive to provide a voltage signal to line 60. When typewriter 16 does not provide this voltage to line 21, isolator 46 is not set. Thus there are two levels of voltage on line 21 that determine the output of power booster 48, because its input is connected by line 60 to the emitter of the transistor of isolator 46 and because resistor 55 is connected to negative voltage and to line 60, while resistor 56 is connected to line 60 and to the common ground. This construction, as in the case of line 38 and resistors 35 and 36 connected to the input of booster 37, provides from the output of booster 48 logic-level voltage signals through resistor 51 to line 11 of bus 10. It is only one of these voltages on line 11 that provides a voltage level on line 19 that is sensed by computer 15. That voltage represents the voltage on line 21 that is applied from the output terminal of typewriter 16 when it is in the on-line condition.

The emitter of the transistor of optical isolator 47 is connected by a line 61 to the input of booster 49 that has its output connected through resistor 52 to line 12 of bus 10. The resistors 53 and 54 are connected to line 61 at a common junction. A negative voltage is applied to resistor 53 and resistor 54 is connected to the common ground. With this construction the logic-level voltage signals, as data output at an output terminal of typewriter 16 in the form of digital information, provide logic-level voltage signals to line 12 of bus 10. These signals provide logic-level voltage signals to line 20 connected to an input of computer 15 as described earlier.

From the drawing it is seen that there are various lines (numbered or unnumbered) that either extend from computer 15 or typewriter 16 or extend from lines of bus 10 to components mounted on printed circuit board 25 or printed circuit board 26. A part of these lines, that are on either board, actually constitute some of the printed conducting lines on the board. These printed conducting lines extend to the margins of the board. The other part of each of these lines, that are shown, are suitably connected to the appropriate printed line using edge connectors. It is seen also from the drawing that various lines on the board interconnect various components mounted on the board. These lines also are printed conducting lines on the boards. The drawing does not show fully the connection of lines from the outputs of the power supply 27 and 28 to inputs for the power boosters or to resistors 35,53 and 55. However, the pattern of printed conducting lines on each board is such that printed conducting lines connect these components to the outputs of the power supply mounted on the same board. With this construction using the commmon type of printed circuit card referred to earlier, it is possible to easily fabricate a large number of boards 26 for use with many typewriters at a number of locations and to easily fabricate many boards 25 for use at the location of computer 15 to facilitate a large number of installations of the system at various locations. Of course, these circuit boards 25 are connected by a suitable interface device to computer 15 and each board 25 is connected to a different set of three lines, illustrated by lines 11 through 13 as one set, of a channel of bus 10. Of course, also each board 26 is connected to a specific set of three lines like 11 through 13. This construction permits the use of a number of boards 26 to communicate a number of typewriters 16 with computer 15 in a simple and economical manner with the other advantages mentioned earlier.

It is seen from the foregoing detailed description of an illustrative embodiment of the system of the invention that computer 15 can determine, before transmitting logic-level voltage signals through booster 37 to typewriter 16, that typewriter 16 is in the condition or status to accept data input. These signals are illustratively ± 6-volt logic-level signals. In the system, typewriter 16 similarly provides logic-level voltage signals through booster 49 to computer 15. The booster 48 provides the data terminal ready voltage signal from typewriter 16 to computer 15. Illustratively it is a 10-volt logic-level signal. The boosters 37,49 and 48 drive these signals with fidelity. The data ready terminal signal to computer 15 via line 11 has fidelity such that, if type-writer 16 is under-powered, computer 15 will not sense the signal and thus will transmit the information to a standby unit just as it will when there is no power applied to typewriter 16.

It is very important that the computer be informed that typewriter 16 is in the condition to accept data because, when using a typewriter or a line printer to receive data from the computer, the receiver device is often unattended for hours. During that period of time the power at the site of the receiver device may be lost or the receiver device may be inadvertently disconnected. The system automatically prevents the transfer of data to that receiver device when it is not in condition to receive it and then to record or display the information.

The foregoing detailed description shows the construction when the receiver device is a typewriter that is also a transmitter device. When the receiver device is not a transmitter device it is not necessary to have certain components that are described above as mounted on board 26. In such case board 26 is not required to have mounted on it power booster 49, optical isolator 47 and resistors 52,53 and 54.

The foregoing description of the system of the invention has been presented solely for the purpose of illustration and not be way of limitation of the invention because the latter is limited only by the claims that follow.

We claim:

1. A line driver system for digital communication between an electronic transmitter device and an electronic receiver device which comprises:

an electronic transmitter-receiver device, at a first location, having an output and an input, said transmitter-receiver device being constructed to provide digital information to said output as logic-level voltage signals only if there is a voltage signal at said input just prior to said transmitter-receiver device being operative to provide said signals to said output;

an electronic receiver device, at a second location, having an input to receive logic-level voltage signals and an output, said receiver device being constructed to convert logic-level voltage signals from its said input to a readable form and to provide at its said output a voltage signal while said receiver device is in an on-line condition to provide said conversion of said logic-level voltage signals when received at said input of said receiver device;

a bus extending between said first and second locations and including first and second lines;

a first power booster as a digital line driver, at said first location, comprising a high current gain amplifier with unity voltage gain and having an output and an input;

first electrical conducting means connected to said first line only of said bus, at said first location, and to said output of said first power booster, said first electrical conducting means providing the only connection for logic-level signal transmission to said bus from said first power booster;

second electrical conducting means connected to said output of said transmitter-receiver device and to said input only of said first power booster, said second electrical conducting means providing the only connection between said transmitter-receiver device and said first power booster;

third electrical conducting means connected to said second line of said bus at said first location and to said input of said transmitter-receiver device to provide said voltage signal at that input when there is a voltage signal on said second line of said bus;

a second power booster as a digital line driver, at said second location, comprising a high current gain amplifier with unity voltage gain and having an output and an input;

fourth electrical conducting means connected to said second line only of said bus at said second location and to said output of said power booster, said fourth electrical conducting means providing the only connection for logic-level signal transmission to said bus from said second power booster;

fifth electrical conducting means connected to said output of said receiver device and to said input only of said second power booster, said fifth electrical conducting means providing the only connection between said receiver device and said second power booster; and sixth electrical conducting means connected to said first line of said bus at said second location and to said input of said receiver device to provide said voltage signal at said output of said receiver device to said second line of said bus.

2. The system of claim 1 wherein:
said transmitter-receiver device is a computer; and
said receiver device is a typewriter, a line printer, or a cathode ray tube.

3. The system of claim 1 wherein:
said transmitter-receiver device is a computer;
said computer has a second input to receive digital information as logic-level voltage signals;
said bus includes a third line; and
said receiver device is a typewriter or a cathode ray tube that has a second output and is constructed as an electronic transmitter-receiver device to provide digital information as logic-level voltage signals at said second output,
said system further including:
seventh electrical conducting means connected to said third line of said bus, at said first location, and to said second input of said computer to provide logic-level voltage signals on said third line of said bus to said second input of said computer;

a third power booster as a digital line driver, at said second location, comprising a high current gain amplifier with unity voltage gain and having an output and an input;

eighth electrical conducting means connected to said third line only of said bus, at said second location, and to said output of said third power booster, said eighth electrical conducting means providing the only connection for logic-level signal transmission to said bus from said third power booster; and ninth electrical conducting means connected to said second output of said receiver device and to said input of said third power booster, said ninth electrical conducting means providing the only connection between said receiver device and said third power booster.

4. The system of claim 1 wherein:
said second electrical conducting means includes first and second electrical conductors and a first optical isolator having a light-emitting diode and a transistor that is conducting when it receives a photon emitted by said diode, said first electrical conductor being connected to said output of said transmitter-receiver device and to the anode of said diode of said first optical isolator and said second electrical conductor being connected to said input of said first power booster and to the emitter of said transistor of said first optical isolater to provide a voltage signal from said emitter to said second electrical conductor when said transistor of said first optical isolator is conducting;

said third electrical conducting means includes third and fourth electrical conductors and a second optical isolator having a light-emitting diode and a transistor that is conducting when it receives a photon emitted by said diode, said third electrical conductor being connected to said second line of said bus and to the anode of said diode of said second optical isolator and said fourth electrical conductor being connected to said input of said transmitter-receiver device and to the collector of said transistor of said second optical isolator;

said fifth electrical conducting means includes fifth and sixth electrical conductors and a third optical isolator having a light-emitting diode and a transistor that is conducting when it receives a photon emitted by said diode, said fifth electrical conductor being connected to said output of said receiver device and to the anode of said diode of said third optical isolator and said sixth electrical conductor being connected to said input of said second power booster and to the emitter of said transistor of said third optical isolator to provide a voltage signal from said emitter to said sixth electrical conductor when said transistor of said third optical isolator is conducting; and said sixth electrical conducting means includes seventh and eighth electrical conductors and a fourth optical isolator having a light-emitting diode and a transistor that is conducting when it receives a photon emitted by said diode, said seventh electrical conductor being connected to said first line of said bus and to the anode of said diode of said fourth optical isolator and said eighth electrical conductor being connected to said input of said receiver device and to the collector of said transistor of said fourth optical isolator, said system further including:

a first resistor connected to a voltage source and to said second electrical conductor and a second resistor also connected to said second electrical conductor and connected to ground potential, whereby said input of said first power booster is provided with voltage signals of two different levels only, said levels being determined by whether said transistor of said first optical isolator is or is not conducting; and a third resistor connected to a voltage source and to said sixth electrical conductor and a fourth resistor also connected to said sixth electrical conductor and connected to ground potential, whereby said input of said second power booster is provided with voltage signals of two different levels only, said levels being determined by whether said transistor of said third optical isolator is or is not conducting.

5. The system of claim 4 and further including:

a first printed circuit board, at said first location, having a pattern of a number of first printed conducting lines; and a second printed circuit board, at said second location, having a pattern of a number of second printed conducting lines, wherein:

said first power booster, said first and second optical isolators, and said first and second resistors are mounted on said first printed circuit board;

said first electrical conducting means and said first, second, third and fourth electrical conductors are provided in part by some of said first printed conducting lines on said first printed circuit board;

said second power booster, said third and fourth optical isolators, and said third and fourth resistors are mounted on said second printed circuit board; and said fourth electrical conducting means and said fifth, sixth, seventh and eighth electrical conductors are provided in part by some of said second printed conducting lines on said second printed circuit board.

6. The system of claim 5 and further including:

a first power supply mounted on said first printed circuit board and having outputs providing different voltages, said outputs of said first power supply being connected by part of said printed conducting lines to said first power booster, said first optical isolator, and said first resistor that are mounted on that board; and a second power supply mounted on said second printed circuit board and having outputs providing different voltages, said outputs of said second power supply being connected by part of said printed conducting lines to said second power booster, said third optical isolator, and said third resistor that are mounted on that board.

7. The system of claim 4 wherein:

said transmitter-receiver device is a computer;

said computer has a second input to receive digital information as logic-level voltage signals;

said bus includes a third line; and said receiver device is a typewriter or a cathode ray tube that has a second output and is constructed as an electronic transmitter-receiver device to provide digital information as logic-level voltage signals at said second output, said system further including: seventh electrical conducting means connected to said third line of said bus, at said first location, and to said second input of said computer to provide logic-level voltage signals on said third line of said bus to said second input of said computer;

a third power booster as a digital line driver, at said second location, comprising a high current gain amplifier with unity voltage gain and having an output and an input;

eighth electrical conducting means connected to said third line only of said bus, at said second location, and to said output of said third power booster, said eighth electrical conducting means providing the only connection for logic-level signal transmission to said bus from said third power booster; and ninth electrical conducting means connected to said second output of said receiver device, at said second location, and to said input of said third power booster, said ninth electrical conducting means providing the only connection between said receiver device and said third power booster, wherein:

said seventh electrical conducting means includes ninth and tenth electrical conductors and a fifth optical isolator having a light-emitting diode and a transistor that is conducting when it receives a photon emitted by said diode, said ninth electrical conductor being connected to said third line of said bus and to the anode of said diode of said fifth optical isolator and said tenth electrical conductor being connected to said second input of said computer and to the collector of said transistor of said fifth optical isolator; and said ninth electrical conducting means includes eleventh and twelfth electrical conductors and a sixth optical isolator having a light-emitting diode and a transistor that is conducting when it receives a photon emitted by said diode, said eleventh electrical conductor being connected to said second output of said receiver device and to the anode of said diode of said sixth optical isolator and said twelfth electrical conductor being connected to said input of said third power booster and to the emitter of said transistor of said sixth optical isolator to provide a voltage signal from said emitter to said twelfth electrical conductor when said transistor of said sixth optical isolator is conducting, said system further including a fifth resistor connected to a voltage source and to said twelfth electrical conductor and a sixth resistor also connected to said twelfth electrical conductor and connected to ground potential, whereby said input of said third power booster is provided with voltage signals of two different levels only, said levels being determined by whether said transistor of said sixth optical isolator is or is not conducting.

8. The system of claim 7 and further including:

a first printed circuit board, at said first location, having a pattern of a number of first printed conducting lines; and a second printed circuit board, at said second location, having a pattern of a number of second printed conducting lines, wherein:

said first power booster, said first, second and fifth optical isolators, and said first and second resistors are mounted on said first printed circuit board;

said first electrical conducting means and said first, second, third, fourth, ninth and tenth electrical conductors are provided in part by some of said first printed conducting lines on said first printed circuit board;

said second and third power boosters, said third, fourth and sixth optical isolators, and said third, fourth, fifth and sixth resistors are mounted on said second printed circuit board; and said fourth electrical conducting means and said fifth, sixth, seventh, eighth, eleventh and twelfth electrical conductors are provided in part by some of said second printed conducting lines on said second printed circuit board.

9. The system of claim 8 and further including:

a first power supply mounted on said first printed circuit board and having outputs providing different voltages, said outputs of said first power supply being connected by part of said printed conducting lines to said first power booster, said first optical isolator, and said first resistor that are mounted on that board; and a second power supply mounted on said second printed circuit board and having outputs providing different voltages, said outputs of said second power supply being connected by part of said printed conducting lines to said second and third power boosters, said third and sixth optical isolators, and said third and fifth resistors that are mounted on that board.

10. A printed circuit board which comprises:

a pattern of a number of printed electrical conducting lines, including first, second, third, fourth and fifth conducting lines on said board:

a power booster as a digital line driver, having a high current gain amplifier with unity voltage gain and having an input and an output, mounted on said board;

first and second optical isolators mounted on said printed circuit board, each of said isolators having a light-emitting diode and a transistor that is conducting when it receives a photon emitted by said diode; and first and second resistors mounted on said printed circuit board, wherein:

said first conducting line is connected to said output of said power booster and is connectable to a first line of a bus;

said second conducting line is connected to said input of said power booster and to the emitter of said transistor of said first optical isolator;

said first and second resistors are connected to said second conducting line that connects said input of said power booster and said first optical isolator;

said third conducting line is connected to said anode of said diode of said first optical isolator and is connectable to an output of a receiver device, that provides at that output a voltage signal while said receiver device is in an on-line condition, or to an output of a transmitter-receiver device;

said fourth conducting line is connected to said anode of said second isolator and is connectable to a second line of the bus; and said fifth conducting line is connected to the collector of said transistor of said second isolator and is connectable to an input of the receiver device or the transmitter-receiver device.

11. The printed circuit board of claim 10 and further including a power supply mounted on said printed circuit board and having two outputs that provide different voltages, in which said outputs are suitably connected to other printed conducting lines of said number of printed conducting lines to provide two voltages to said first power booster for its operation, and to provide one of these voltages to said first resistor.

12. The printed circuit board of claim 11 in which one of said two outputs of said power supply is connected by one of said other printed conducting lines to the collector of said transistor of said first optical isolator.

13. A printed circuit board which comprises:

a pattern of a number of printed electrical conducting lines, including first, second, third, fourth, fifth, sixth, seventh and eighth conducting lines on said board;

first and second power boosters as digital line drivers, each having a high current gain amplifier with unity voltage gain and having an input and an output, mounted on said board;

first, second and third optical isolators mounted on said printed circuit board, each of said isolators having a light-emitting diode and a transistor that is conducting when it receives a photon emitted by said diode; and first, second, third and fourth resistors mounted on said printed circuit board, wherein:

said first conducting line is connected to said output of said first power booster and is connectable to a first line of a bus;

said second conducting line is connected to said input of said first power booster and to the emitter of said transistor of said first optical isolator;

said first and second resistors are connected to said second conducting line that connects said input of said first power booster and said first optical isolator;

said third conducting line is connected to said anode of said diode of said first optical isolator and is connectable to an output of a receiver device that provides at that output a voltage signal while the device is in the on-line condition to receive data as logic-level voltage signals, the receiver device being constructed as an electronic transmitter-receiver device to provide, at a second output, digital information as logic-level voltage signals;

said fourth conducting line is connected to said anode of said second isolator and is connectable to a second line of the bus;

said fifth conducting line is connected to the collector of said transistor of said second isolator and is connectable to an input of the receiver device;

said sixth conducting line is connected to said output of said second power booster and is connectable to a third line of the bus;

said seventh conducting line is connected to said input of said second power booster and to the emitter of said transistor of said third optical isolator;

said third and fourth resistors are connected to said seventh conducting line that connects said input of said second power booster and said third optical isolator;

said eighth conducting line is connected to said anode of said diode of said third optical isolator and is connectable to the second output of the receiver device.

14. The printed circuit board of claim 13 and further including a power supply mounted on said printed circuit board and having two outputs that provide different voltages, in which said outputs are suitably connected to other printed conducting lines of said number of printed conducting lines to provide two voltages to said first and second power boosters for their operation and to provide one of these voltages to said first and third resistors and in which one of said two outputs of said power supply is connected to the collectors of said transistors of said first and third optical isolators using printed conducting lines of said other printed conducting lines.

15. A printed circuit board having a pattern of a number of printed conducting lines and said board being constructed to provide for mounting, at different areas of the board, two power boosters as digital line drivers, three optical isolators, four resistors and a power supply on said board, said printed conducting lines being present on said board in a pattern to provide said pattern of a number of first printed conducting lines and said pattern of a number of second printed conducting lines so that:

from the area of mounting of the power supply extend printed conducting lines to the areas of mounting of the two power boosters, to the areas of mounting of two of the three optical isolators and to the areas of mounting of two of the four resistors;

from the areas of mounting of two of the optical isolators to the areas of mounting of the two power boosters extend printed conducting lines, from which extend printed conducting lines to the areas of mounting of said two of the four resistors and printed conducting lines to the areas of mounting of the other two of the four resistors;

from the areas of mounting of said other two of the four resistors and the areas of mounting of the three optical isolators extend printed conducting lines for connection to a printed conducting line that extends to an edge of said board for connection to an edge connector connectable to a common ground;

from the areas of mounting of the three optical isolators extend printed conducting lines to an edge of said board for connection to an edge connector connectable to the receiver device or the transmitter-receiver device;

from the areas of mounting of two of the three optical isolators extend printed conducting lines to an edge of said board for connection to an edge connector connectable to a bus; and from the areas of mounting of the two power boosters extend printed conducting lines to an edge of said board for connection to an edge connector connectable to the bus, and so that, after mounting the power supply, after mounting one or both of the power boosters, after mounting either the appropriate two or all of the four resistors, and after suitable mounting of the three optical isolators at said areas of mounting on said board for electrical connection to the printed conducting lines, the board is useful.

* * * * *